Nov. 8, 1932. P. LACROIX 1,887,060
HYDROPNEUMATIC SUSPENSION AND SHOCK ABSORBING DEVICE FOR VEHICLES
Filed July 16, 1931 3 Sheets-Sheet 1

Inventor
Pierre Lacroix
per J. Severi
Attorney.

Nov. 8, 1932.  P. LACROIX  1,887,060
HYDROPNEUMATIC SUSPENSION AND SHOCK ABSORBING DEVICE FOR VEHICLES
Filed July 16, 1931  3 Sheets-Sheet 2

Inventor
Pierre Lacroix
per Severy
Attorney.

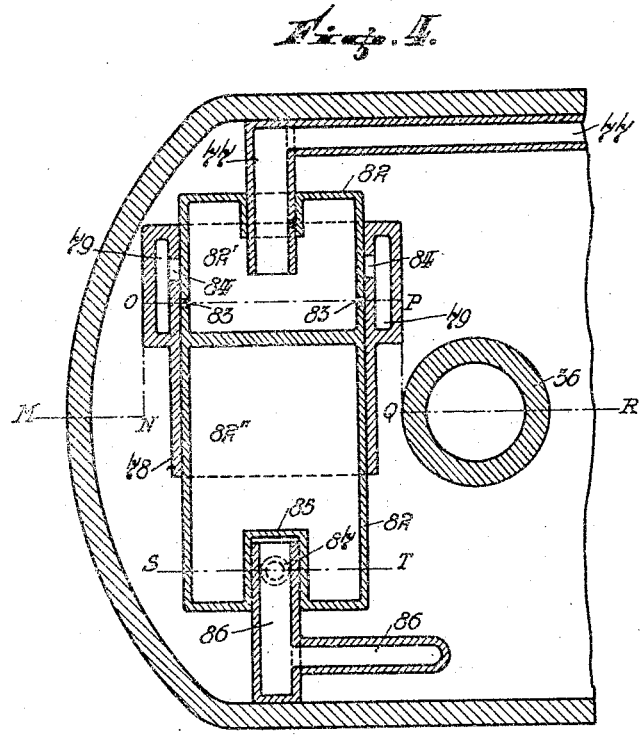
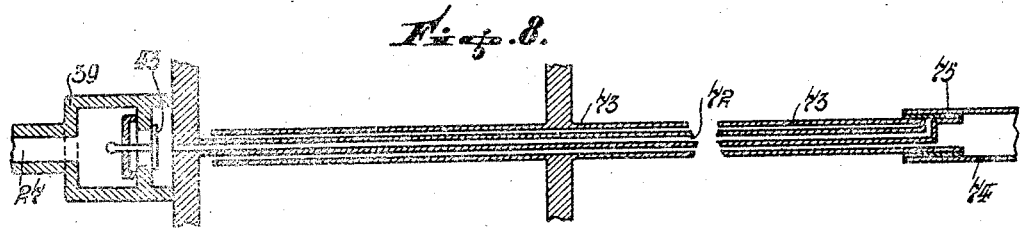
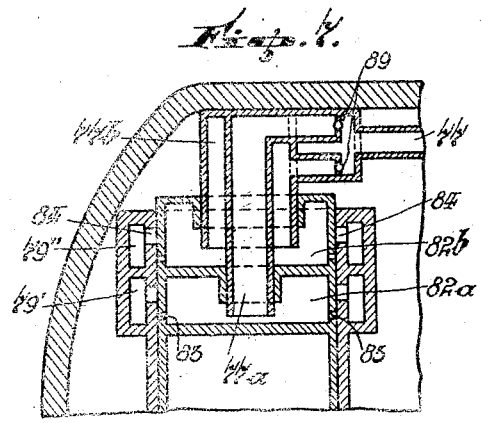

Patented Nov. 8, 1932

1,887,060

UNITED STATES PATENT OFFICE

PIERRE LACROIX, OF BAUCE-FLAWINNE, BELGIUM

HYDROPNEUMATIC SUSPENSION AND SHOCK-ABSORBING DEVICE FOR VEHICLES

Application filed July 16, 1931, Serial No. 553,147, and in Belgium October 4, 1930.

The present invention relates to a hydropneumatic suspension and shock-absorbing device for vehicles, which will advantageously replace the ordinary mechanical suspension device, which generally comprises leaf-springs connected in a known manner.

The new suspension device simultaneously constitutes a shock-absorbing means, the cushioning effects being obtained by pneumatic compression and the throttled circulation of a liquid.

The hydro-pneumatic suspension device in conformity with the invention is formed with two cooperating elements adapted to have a reciprocating movement the one with respect to the other, one of said elements being connected to the vehicle body or frame and the other to the wheel axle or the like.

The elements are formed with one or more groups of two or more telescopic cylinders, whereof one or more, preferably corresponding in each group, contain a liquid, whereas the other or others are charged with air under pressure. Resiliency and shock-absorbing effect of this suspension are obtained by the compression of the air and by the throttling of the liquid circulating in appropriate passages.

The device has been designed so as to comply with the different requirements of a running vehicle, such as: vibrations, shocks and reactions, centrifugal force, sudden approaching and distancing of the vehicle body and the running elements or wheels.

The improved apparatus is provided with feed means returning the liquid to the respective cylinder or cylinders, and means for supplying air under pressure to compensate the loss of said air from the apparatus in different circumstances, such as abnormal and persistent strains resulting from a too long immobilization or from the load of the vehicle.

The invention will be described with reference to a preferred form of embodiment illustrated in the accompanying drawings, the apparatus illustrated comprising two groups of two cylinders.

Fig. 4 is a horizontal section on line K—L of Fig. 3;

Fig. 7 is a horizontal section of the device illustrated in Fig. 6;

Fig. 8 is an axial section of the feed means of the apparatus.

Figure 1:
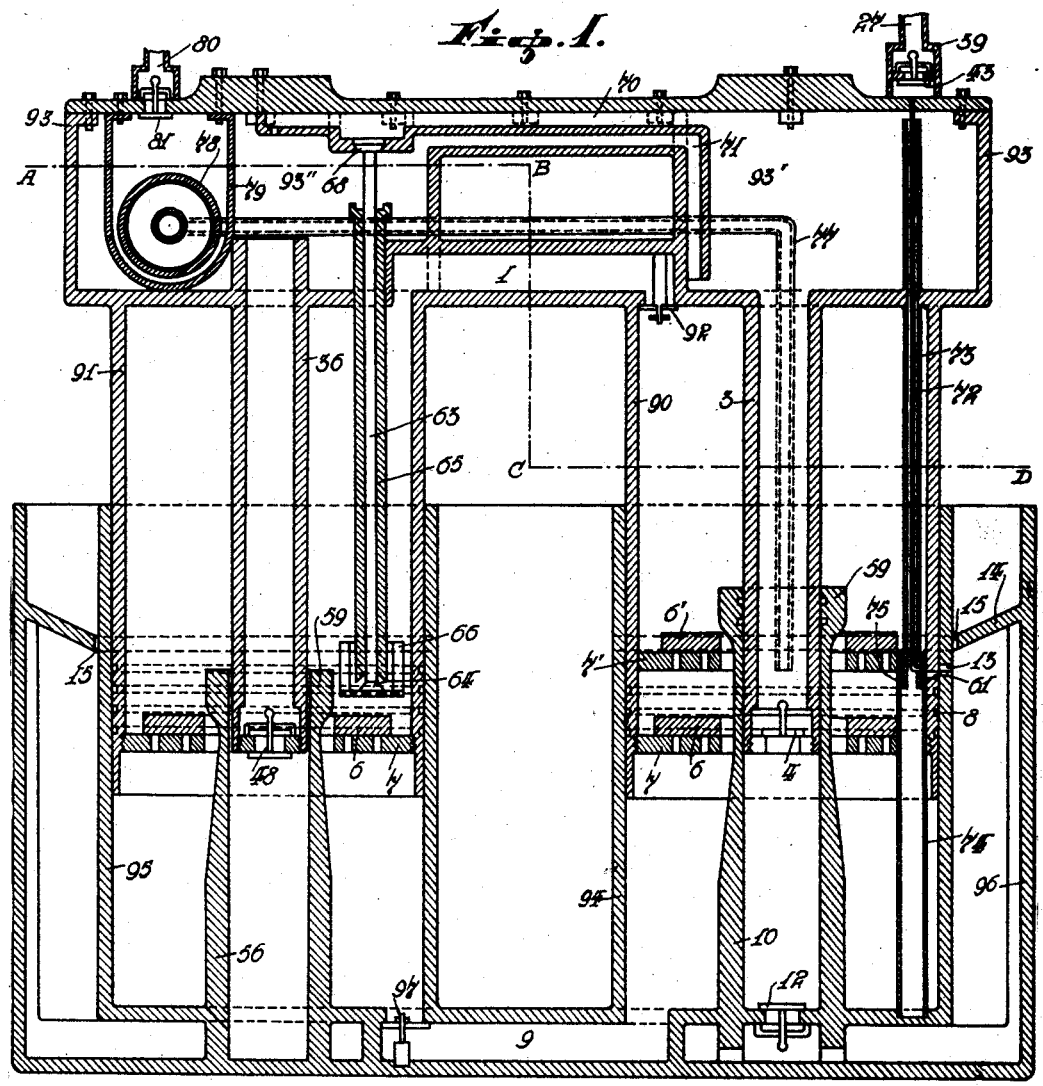
Fig. 1 is a longitudinal vertical section of the device.

The suspension device is formed with cylinders 90 and 91, communicating overhead by the conduit 1. Above the cylinders is arranged a casing 93, having any convenient conformation, the inner space of which is divided into two compartments 93', 93", communicating with each other by a tube 71, starting from the lower portion of compartment 93' and ending in the upper portion of compartment 93". Both compartments can also communicate at their upper portion by the conduit 70, but this latter is eventually closed by a valve 68. This valve 68 is fixed on a stem 63 sliding in a guide tube 65, which guides the passage of the stem 63 into the cylinder 91. At its lower end, the stem 63 is provided with a shoulder 64 to which is connected a float 66. The valve 68 opens upwards.

These cylinders 94 and 95, intended for containing the liquid medium of the device, have a bore corresponding to the outer diameter of cylinders 90 and 91, which can slide in the aforesaid corresponding cylinders.

The cylinders 94 and 95 are surrounded by a receiver 96 of any convenient shape. The inner volume of the apparatus, namely of the telescopic cylinders, communicates with said receiver 96 when the ports 13 and 61 register, one of said ports being provided in the wall of cylinder 94 and the other in the wall of cylinder 90. The ports 61 are provided at such a level as to correspond with the level of the liquid, for instance the oil contained in cylinders 94 and 95 the device being in its normal resting position, said level being a maximum provided for the suspenson device when the vehicle is at rest. The bottom of cylinders 94 and 95 are each provided with an upright tube 10 and 56. The tube 10 of cylinder 94 is provided at its lower end with a valve 12 opening upwards and making the tube 10 communicate with the outer receiver 96. The upper end of tube 10 is engaged by the lower end of a conduit 3 extending down from the bottom of compartment 93′. Both tubes 3 and 10 frictionally slide within each other. The lower end of the tube 3 is provided with a valve 4 opening upwards. In a similar manner, the upper end of the tube 56 is engaged by the lower end of a conduit 36, which ends in the compartment 93″ of casing 93, in which it extends up to a certain distance from the bottom of this casing. Tube 36 slides without friction in tube 56, and is provided with a valve 48 opening downwards.

The cylinders 90 and 91 are inwardly provided with an annular disc 7, rigidly fixed therein and upon which another annular disc 6 rests freely. The bore of discs 6 and 7 is of somewhat greater diameter than the larger outer diameter of tube 10 or 56. The cylinder 90 is provided with a second pair of similar discs 6′ and 7′, which are of identical construction to the discs 6 and 7 and mounted at a certain distance above the latter. The discs 7 and 7′ are provided with a variable number of passage holes.

In the cylinders 90 and 94 are mounted two coaxial tubes, one of which, 74, forms part with cylinder 94, and the other, 73, forms part simultaneously with casing 93 and cylinder 90. The tube 73 is open at both ends and provided for permanent communication between the inside of tube 74 and the upper portion of casing 93. The tube 73 contains a tube 72 starting from the chest 39, to which air under pressure is supplied by the feed pipe 27. Communication between the two compartments of the chest 39 is effected by a one way valve 43. The tube 72 penetrates into the wall of the tube 73, at a small distance from its lower end, and said tube 72 ends on a level with the outer wall of said tube 73. The tube 74 has a bore of larger diameter than the outer diameter of tube 73; however, its upper end 75 is bored at a diameter corresponding to the outer diameter of tube 73, this latter tube thus frictionally sliding in said end portion of tube 74. Fig. 8 clearly details this construction.

The cylinders 90 and 91 are provided with packing means such as for instance rings 8. The tubes 10 and 56 erected on the bottom of cylinders 94 and 95 have the particular shape as illustrated in Fig. 1. The upper ends 59 of tubes 56 and 10 will frictionally engage the bore of the annular discs 6 and 6′ respectively, when the ports 13 and 61 will register during a telescopic movement of the cylinder groups. Under this head portion 59, the tubes 10 and 56 present a conical tapering neck.

The bore of tube 56 has a larger diameter than the outer diameter of tube 36, but said bore of tube 56 has a decreasing diameter towards its bottom portion, so as to oppose a greater resistance to the flow of liquid expelled from tube 56 through the annular space formed between tubes 56 and 36.

The cylinders 94 and 95 communicate at their lower end by a conduit 9. Valves 92 and 97 are provided in the conduits 1 and 9, so that only the group of cylinders 90 and 94 can receive a supply of air under pressure from the feed 27.

The tube 36 extends within compartment 93″ at a certain distance, and is provided at its lower end with a valve 48 opening downwards.

Figure 5:
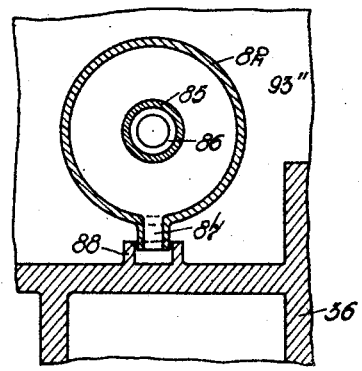
Fig. 5 is a vertical section on line S—T of Fig. 4.
Figure 2:
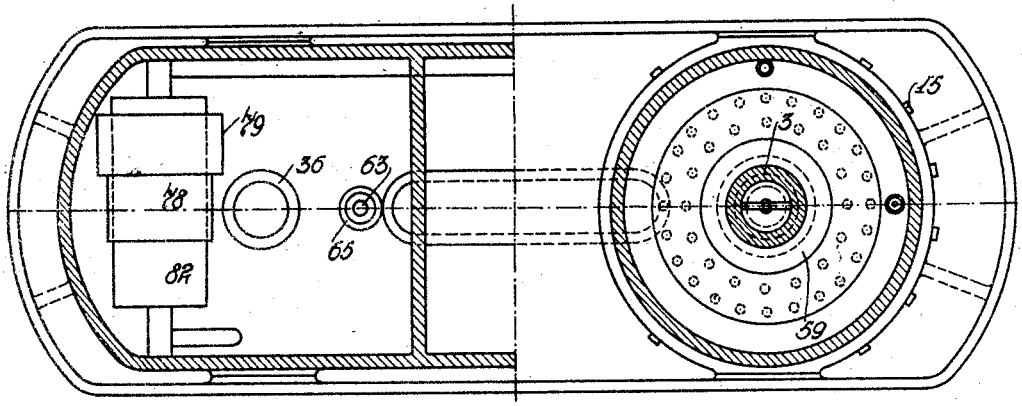
Fig. 2 is a horizontal section on lines A—B—C—D of Fig. 1.
Figure 3:
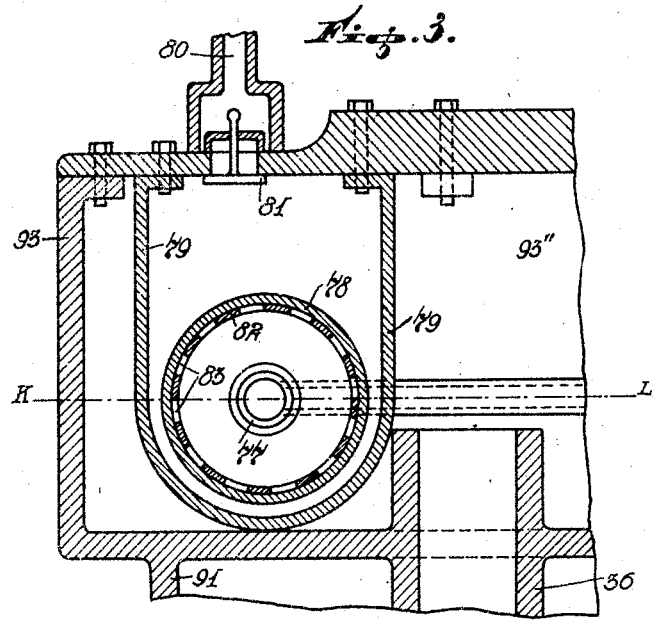
Fig. 3 is a vertical section on lines M—N—O—P—Q—R of Fig. 4.

The apparatus is completed with a distributing device more particularly illustrated in Figs. 3, 4 and 5. This distributing device consists in a cylinder 78, open at both ends and partially surrounded by a chest 79, to which compressed air is supplied by a tube 80 provided with a valve 81 opening into said chest. The axis of cylinder 78 is substantially horizontal and at right angles to the longitudinal axis of the vehicle. In cylinder 78 slides a second cylinder 82. The cylinder 82 is divided into two compartments 82′ and 82″. The compartment 82′ has an end closing wall engaged by the end of a tube 77, packing means being interposed. The compartment 82′ has a number of ports 83, such ports 83 being in their normal position covered by the cylinder 78. The cylinder 78 has a number of ports 84, which can register with ports 83 when cylinder 82 slides in the convenient direction, so that the compartment 82′ will communicate with the chest 79.

In the end closing wall of compartment 82″ is provided a recessed portion 85 engaged by a tube 86 with interposition of packing means, the diameter of the tube 86 corresponding to that of tube 77. This tube end 86 constitutes the guide and stop means for the shifting movements of cylinder 82. At its lower portion the cylinder 82 is provided with a tube end 87 (Fig. 5), which makes the compartment 82″ communicate with compartment 93″ and the end of said tube 87 is guided in a slide 88, so as to prevent rotation of the cylinder 82.

The outer receiver 96 is closed at its upper portion by means of a sloping wall 14 provided with holes 15 allowing the liquid expelled from the cylinder groups to flow back within the receiver.

The working of the suspension and shock-absorbing device will be described hereafter with reference to the successive operations and different requirements of the apparatus.

The suspension device having its cooperating elements respectively connected to the vehicle body and running means, is initially fitted by supplying liquid up to the level of the ports 13. The float 66 is lifted and valve 68 opened. Compressed air is admitted through the conduit 27 and has for object to increase the pressure within casing 93 and to bring the hydropneumatic apparatus in operative position.

If the shocks imparted to the vehicle when running are only vibrations, such movements will be of no influence upon the apparatus, owing to the sufficiently considerable difference between the outer diameter of tubes 56 and 10 and the bores of discs 7, 7' respectively. This arrangement avoids the constant vibratory effect upon vehicles.

In case of abnormal shocks, the cylinders 94 and 95 are telescoping within the cylinders 90 and 91 and the pressure of the air contained in the latter exceeds the normal balance pressure of the system. Simultaneously the liquid escapes through the space between the tubes 10 and 56 and the discs 6 and 7. However, this space decreases with relation to the telescoping movement referred to, so that the braking effect of the air is more and more efficient. It is pointed out that in case of violent shocks the braking action is energetic. In case when the thrust of the liquid will be excessive, the discs 6 will release contact from discs 7 and the liquid will find supplementary passage through the holes provided in discs 7. However, in order to prevent the reaction effects, the discs 6 being freely adapted on discs 7, will close said holes when the elements return back to their normal position, so that during this latter movement the braking effect will be more considerable and absorb the reaction effects. During these movements, the elements: tube 10, tube 3, valves 4 and 12 have worked as an oil pump to supply to the casing 93 a determined quantity of liquid contained in the receiver 96. After a number of such swinging movements, the liquid is brought back towards the cylinders 94 and 95, so that a closed cycle is formed securing a constant balance of the different elements.

If for any reason the liquid will not attain the level provided with respect to cylinders 90 and 91, the float 66 being no longer sustained by said liquid, the valve 68 will apply on its seat. The air under pressure admitted in compartment 93' of casing 93 will not be able to flow directly to the compartment 93''. In this case, the pressure exerted on the surface of the liquid will force it back into the compartment 93'' through the tube 71. From the compartment 93'' the liquid will pass through tube 36, back to the cylinders 95 and 94, as soon as the pressure obtained in room 93 is higher than the pressure existing in the complete system of cylinders 94 and 95 and cylinders 90 and 91.

As soon as the liquid level will lift the float 66, the valve 68 opens and air under pressure will freely pass from compartment 93' into compartment 93'', through the tube 70 and thus the supply of air under pressure will be secured within the system.

When the apparatus is in normal balanced position, the lower end of tube 72 is closed by the part 75 of tube 74. When air under pressure is admitted through tubes 27 and 72, this compressed air will be checked at the end of tube 72. If for any reason the cylinders 90 and 91 are sufficiently lowered with respect to cylinders 94 and 95 so that the end of the tube 72 opens in the enlarged part of tube 74, the compressed air supplied in tube 72 will enter into tube 74 and flow through tube 73 into casing 93. The supply of air under pressure will be stopped when the cylinders 90 and 91 resume their normal position in which the end of tube 72 is closed.

The distributing device may have a compensating action when centrifugal force is acting on the body or running means of the vehicle.

As soon as the vehicle takes a curve, the centrifugal force imparts a sliding movement to cylinders 82 of the suspension devices provided at the outside of the curve and as soon as the ports 83 register with ports 84, a supply of compressed air admitted by 80 enters into the system: cylinder 90 and cylinder 94, so that the pressure is higher than that of system: cylinder 91 and cylinder 95. This increase of pressure will prevent a collapse of the suspension device on this side.

This supplementary pressure imparts to the cylinder 82 a force tending to bring said cylinder back to its initial position, and as soon as said force will exceed the centrifugal force acting on said cylinder 82, the latter will regain its normal position interrupting communication between the chest 79 and the cylinder system 90, 94.

The particular arrangement of compartment 93'' is such that when using the apparatus, the lower part of cylinder 82 will engage an oil bath.

As loading the vehicle results in an increase of pressure in compartment 93'', a quantity of oil will enter into compartment 82'', so that the weight of the body cylinder 82 is increased. The volume of compartment 82'' and the specific gravity of the liquid will be selected so that within determined limits this increase of weight should be approximately proportioned to the weight of the load. The action of the centrifugal force on cylinder 82 will be increased in the same proportions, requiring also a proportional increase of the pressure within the system of cylinders 90 and 94, for the purpose of bringing the distributing device to its initial position.

Figure 6:
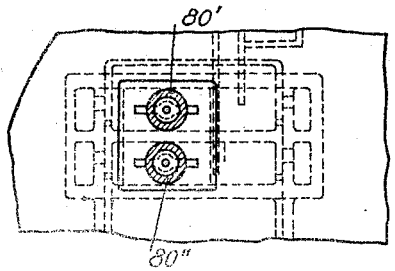
Fig. 6 is a partial plan view showing a multiple distributing device.

If the load imparted to the vehicle has for effect to considerably change the level of the center of gravity, the distributing device should be constructed so as to provide for a plurality of admission tubes 80', 80'' (Fig. 6), so that the compressed air is admitted at a more considerable rate. Fig. 7 illustrates such arrangement, wherein the chest surrounding the cylinder 78 is doubled so as to form channels 79' and 79''. The tube 77 is subdivided into coaxial ends 77a, 77b, each of which communicates with tubes 77, through valves 89. The cylinder 82 has one end subdivided into compartments 82a and 82b, each having ports 83 adapted to register with ports 84 of the chest portions 79', 79''.

The device also allows the pivotal motion of a wheel, a wheel axle, a bogie or the like. The device does not require the constant connection with the source of compressed fluid, as such communication is only wanted for the initial use of the device and on starting the run of a vehicle after a prolonged rest, so as to compensate the loss of compressed fluid and of liquid.

I claim:

1. A hydro-pneumatic suspension device, comprising two pairs of telescopic cylinders in substantially vertical arrangement, connecting conduits between the upper cylinders and the lower cylinders respectively and securing passages in a unilateral direction, a common chamber connecting the upper cylinders and having two compartments, a valve controlled conduit connecting the compartments, tubular elements standing up from the bottom of the lower cylinders, annular discs surrounding said tubular elements and fixed within the upper cylinders, said discs forming throttling means for the liquid passing between the tubular members and the discs respectively, means for supplying air under pressure to the upper cylinders, and a receiver surrounding the lower cylinders for the purpose set forth.

2. A hydro-pneumatic suspension device, comprising two pairs of telescopic cylinders in substantially vertical arrangement, connecting conduits between the upper cylinders and the lower cylinders respectively and securing passages in a unilateral direction, a common chamber connecting the upper cylinders and having two compartments, a valve controlled conduit connecting the compartments, tubular elements standing up from the bottom of the lower cylinders, annular discs surrounding said tubular elements and fixed within the upper cylinders, said discs forming throttling means for the liquid passing between the tubular members and the discs respectively, a pump device inside one pair of telescopic cylinders, said pump feeding the lower cylinder of the adjacent pair of telescopic cylinders, means for supplying air under pressure to the upper cylinders, and a receiver surrounding the lower cylinders for the purpose set forth.

3. A hydro-pneumatic suspension device, comprising two pairs of telescopic cylinders in substantially vertical arrangement, connecting conduits between the upper cylinders and the lower cylinders respectively and securing passages in a unilateral direction, a common chamber connecting the upper cylinders and having two compartments, a valve controlled conduit connecting the compartments, tubular elements standing up from the bottom of the lower cylinders, annular discs surrounding said tubular elements and fixed within the upper cylinders, said discs forming throttling means for the liquid passing between the tubular members and the discs respectively, a pump device inside one pair of telescopic cylinders, said pump feeding the lower cylinder of the adjacent pair of telescopic cylinders, a valve chest for a supply of air under pressure, telescopic tubes extending throughout a pair of telescopic cylinders, a feed pipe for air under pressure extending from the valve chest inside both telescopic tubes, means for closing the feed pipe when the telescopic cylinders are in normal position, and a receiver surrounding the lower cylinders for the purpose set forth.

4. A hydro-pneumatic suspension device, comprising two pairs of telescopic cylinders in substantially vertical arrangement, connecting conduits between the upper cylinders and the lower cylinders respectively and securing passages in a unilateral direction, a common chamber connecting the upper cylinders and having two compartments, a valve controlled conduit connecting the compartments, tubular elements standing up from the bottom of the lower cylinders, annular discs surrounding said tubular elements and fixed within the upper cylinders, said discs forming throttling means for the liquid passing between the tubular members and the discs respectively, a movable member adapted to supply air under pressure to one pair of telescopic cylinders under the action of centrifugal force imparted to the device in a turning movement of the vehicle, means for supplying air under pressure to the upper cylinders, and a receiver surrounding the lower cylinders for the purpose set forth.

5. A hydro-pneumatic suspension device, comprising two pairs of telescopic cylinders in substantially vertical arrangement, connecting conduits between the upper cylinders and the lower cylinders respectively and securing passages in a unilateral direction, a common chamber connecting the upper cylinders and having two compartments, a valve controlling conduit connecting the compartments, tubular elements standing up from the bottom of the lower cylinders, annular discs surrounding said tubular elements and fixed within the upper cylinders, said discs forming throttling means for the liquid passing between the tubular members and the discs respectively, a chest inside said common chamber communicating with a source of compressed air, a cylinder slidable in said chest under the centrifugal force acting on the suspension device, ports in the chest and slidable cylinder respectively, a conduit connecting said sliding cylinder and one of the upper cylinders, means for supplying air under pressure to the upper cylinders, and a receiver surrounding the lower cylinders for the purpose set forth.

In testimony whereof I signed hereunto my name.

PIERRE LACROIX.